(12) United States Patent
Kawahata

(10) Patent No.: US 7,701,349 B2
(45) Date of Patent: Apr. 20, 2010

(54) IC TAG READ-WRITE APPARATUS AND ANTENNA UNIT THEREOF

(75) Inventor: Koji Kawahata, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 416 days.

(21) Appl. No.: 11/641,828

(22) Filed: Dec. 20, 2006

(65) Prior Publication Data

US 2007/0159334 A1   Jul. 12, 2007

(30) Foreign Application Priority Data

Dec. 26, 2005  (JP)  ............................. 2005-371729

(51) Int. Cl.
*G08B 13/14* (2006.01)

(52) U.S. Cl. .................. 340/572.7; 340/10.2; 340/10.3; 340/10.42; 340/572.1

(58) Field of Classification Search ... 340/572.1–572.9, 340/568.1, 10.1, 10.3, 825, 10.51, 10.2, 10.42, 340/10.4, 933; 455/39, 500, 507, 517, 41.1
See application file for complete search history.

(56) References Cited

U.S. PATENT DOCUMENTS

| | | | | |
|---|---|---|---|---|
| 4,336,613 A | * | 6/1982 | Hewes | 375/223 |
| 4,975,926 A | * | 12/1990 | Knapp | 375/141 |
| 5,640,151 A | * | 6/1997 | Reis et al. | 340/10.2 |
| 6,335,686 B1 | * | 1/2002 | Goff et al. | 340/572.4 |
| 7,005,968 B1 | * | 2/2006 | Bridgelall | 340/10.42 |
| 7,030,732 B2 | * | 4/2006 | Tuttle | 340/10.1 |
| 7,119,736 B2 | * | 10/2006 | Heide et al. | 342/125 |
| 7,259,677 B2 | * | 8/2007 | Fujii | 340/572.7 |
| 2005/0167497 A1 | | 8/2005 | Fujii | |
| 2007/0229278 A1 | * | 10/2007 | Nagata et al. | 340/572.7 |

FOREIGN PATENT DOCUMENTS

| | | |
|---|---|---|
| JP | 7-200749 | 8/1995 |
| JP | 2002-259921 | 9/2002 |
| JP | 2006-60763 | 3/2006 |
| WO | WO-02/19252 | 3/2002 |

* cited by examiner

*Primary Examiner*—Daniel Previl
(74) *Attorney, Agent, or Firm*—Dickstein Shapiro LLP

(57) ABSTRACT

An IC tag read-write apparatus includes a control circuit, a transmission link, and a plurality of antenna units. The control circuit controls data relative to an outgoing carrier wave and an incoming carrier wave. The antenna units correspond to a plurality of IC tags. Each of the antenna units includes a modem, a first antenna, and an indication circuit. The modem is connected to the control circuit through the transmission link and modulates the carrier wave based on the data in a data writing operation and demodulates the incoming carrier wave in a data reading operation. The first antenna sends the modulated carrier wave by air to a second antenna of a corresponding one of the IC tags. The indication circuit generates property information with respect to the antenna unit.

20 Claims, 7 Drawing Sheets

IC TAG READ-WRITE APPARATUS AND ANTENNA UNIT THEREOF

BACKGROUND OF THE INVENTION

1. Field of the Invention

The present invention generally relates to an IC tag read-write apparatus and an antenna unit thereof, and more particularly to an IC tag read-write apparatus and an antenna unit thereof which have an increased flexibility in an installation location.

2. Discussion of the Background

A background IC (integrated circuit) tag read-write apparatus for reading and writing data relative to an IC tag installed in a remote apparatus has been widespread. One example IC tag read-write apparatus 100 is illustrated in FIG. 1. FIG. 1 illustrates the background IC tag read-write apparatus 100 and a plurality of IC tags TG1-TGn to which the background IC tag read-write apparatus 100 performs data read and write operations. In an alphanumeric expression of elements, such as TG1-TGn, n is an arbitrary integer greater than 1, such as 2, 3, 4, and so on and TG1-TGn means TG1, TG2, TG3, TG4, and TG5 when n is 5. This definition of n is applied to each case whenever it appears in an alphanumeric expression of elements described below.

As illustrated in FIG. 1, the background IC tag read-write apparatus 100 includes a transmission link 105, a circuit unit 106, a plurality of signal lines L1-Sn, and a plurality of antenna units ANU1-ANUn. The plurality of antenna units ANU1-ANUn have a structure similar to each other. That is, the antenna unit ANU1 includes a switch SWA1 and an antenna ANTA1, and the antenna unit ANUn includes a switch SWAn and an antenna ANTAn. In the plurality of antenna units ANU1-ANUn, an arbitrary antenna unit ANUk includes a switch SWAk and an antenna ANTAk. In an alphanumeric expression of elements, such as ANUk, k is an arbitrary integer varying from 1 to n.

In FIG. 1, the plurality of IC tags TG1-TGn have a structure similar to each other. That is, the IC tag TG1 includes an antenna ANTB1 and a modem DE1, and the IC tag TGn include an antennal ANTBn and a modem DEn.

The circuit unit 106 includes an oscillation circuit 101, a control circuit 102, and a modem 103. The control circuit 102 is connected to control gates of the switches SWA1-SWAn via the signal lines L1-Sn, respectively. Also, the modem 103 is connected to the switches SWA1-SWAn via the transmission link 105. In the circuit unit 106, the oscillation circuit 101 generates a carrier wave and sends it to the control circuit 102.

To perform a data writing to an arbitrary IC tag TGk, the control circuit 102 controls a data signal to be superimposed on the carrier wave output from the oscillation circuit 101, and exclusively turns on the switch SWAk of the antenna unit ANUk corresponding to the IC tag TGk. Upon receiving the carrier wave and the data signal from the control circuit 102, the modem 103 modulates the carrier wave in accordance with the data signal and sends the modulated data to the antenna ANTAk. The antenna ANTAk sends the modulated data by a radio wave. The IC tag TGk receives the radio wave sent from the IC tag read-write apparatus 100 with an antenna ANTBk and demodulates the received signal with a modem DEk.

To read data of the IC tag TGk, the IC tag read-write apparatus 100 initiates read command data to the IC tag TGk. Upon receiving the read command data, the IC tag TGk modulates the carrier wave based on requested data with the modem DEk and sends the modulated data by a radio wave with the antenna ANTBk. The IC tag read-write apparatus 100 receives the radio wave with the antenna ANTAk, demodulates the signal of the radio wave with the modem 103, and retrieves the data with the control circuit 102.

In the IC read-write apparatus 100 of FIG. 1, the cable length of the transmission link between the circuit unit 106 and each of the plurality of antenna units ANU1-ANUn is limited to the order of 200 mm due to an electric loss of the carrier wave which loss will be increased with an increase of a frequency of the carrier wave. This causes a great limitation to an arrangement of the circuit unit 106 and the plurality of antenna units AU1-AUn.

SUMMARY OF THE INVENTION

In one example, an IC tag read-write apparatus includes a control circuit, a transmission link, and a plurality of antenna units. The control circuit is configured to control data relative to an outgoing carrier wave and an incoming carrier wave. The plurality of antenna units correspond to a plurality of IC tags. Each of the plurality of antenna units includes a modem, a first antenna, and an indication circuit. The modem is connected to the control circuit through the transmission link and is configured to modulate the carrier wave based on the data in a data writing operation and to demodulate the incoming carrier wave in a data reading operation. The first antenna is configured to send the modulated carrier wave by air to a second antenna of a corresponding one of the plurality of IC tags. The indication circuit is configured to generate property information with respect to the antenna unit.

In another example, an IC tag read-write apparatus includes a control circuit, a transmission link, and a plurality of antenna units. The control circuit is configured to control data relative to an outgoing carrier wave and an incoming carrier wave. The plurality of antenna units correspond to a plurality of IC tags. Each of the plurality of antenna units includes a modem, a first antenna, and a filter circuit. The modem is connected to the control circuit through the transmission link and is configured to modulate the carrier wave based on the data in a data writing operation and demodulates the incoming carrier wave in a data reading operation. The first antenna is configured to send the modulated carrier wave by air to a second antenna of a corresponding one of the plurality of IC tags. The filter circuit includes a plurality of analog filters having properties different from each other and configured to selectively connect one of the plurality of analog filters to the modem on an exclusive basis in response to an input control signal.

In further another example, an antenna apparatus for use in an IC tag read-write apparatus having a control circuit and a transmission link includes a plurality of antenna units, a modem, a first antenna, and a filter circuit. The plurality of antenna units correspond to a plurality of IC tags. Each of the plurality of antenna units includes a modem connected to the control circuit through the transmission link and configured to modulate the carrier wave based on the data in a data writing operation and to demodulate the incoming carrier wave in a data reading operation. The first antenna is configured to send the modulated carrier wave by air to a second antenna of a corresponding one of the plurality of IC tags. The filter circuit includes a plurality of analog filters having properties different from each other and is configured to selectively connect one of the plurality of analog filters to the modem on an exclusive basis in response to an input control signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
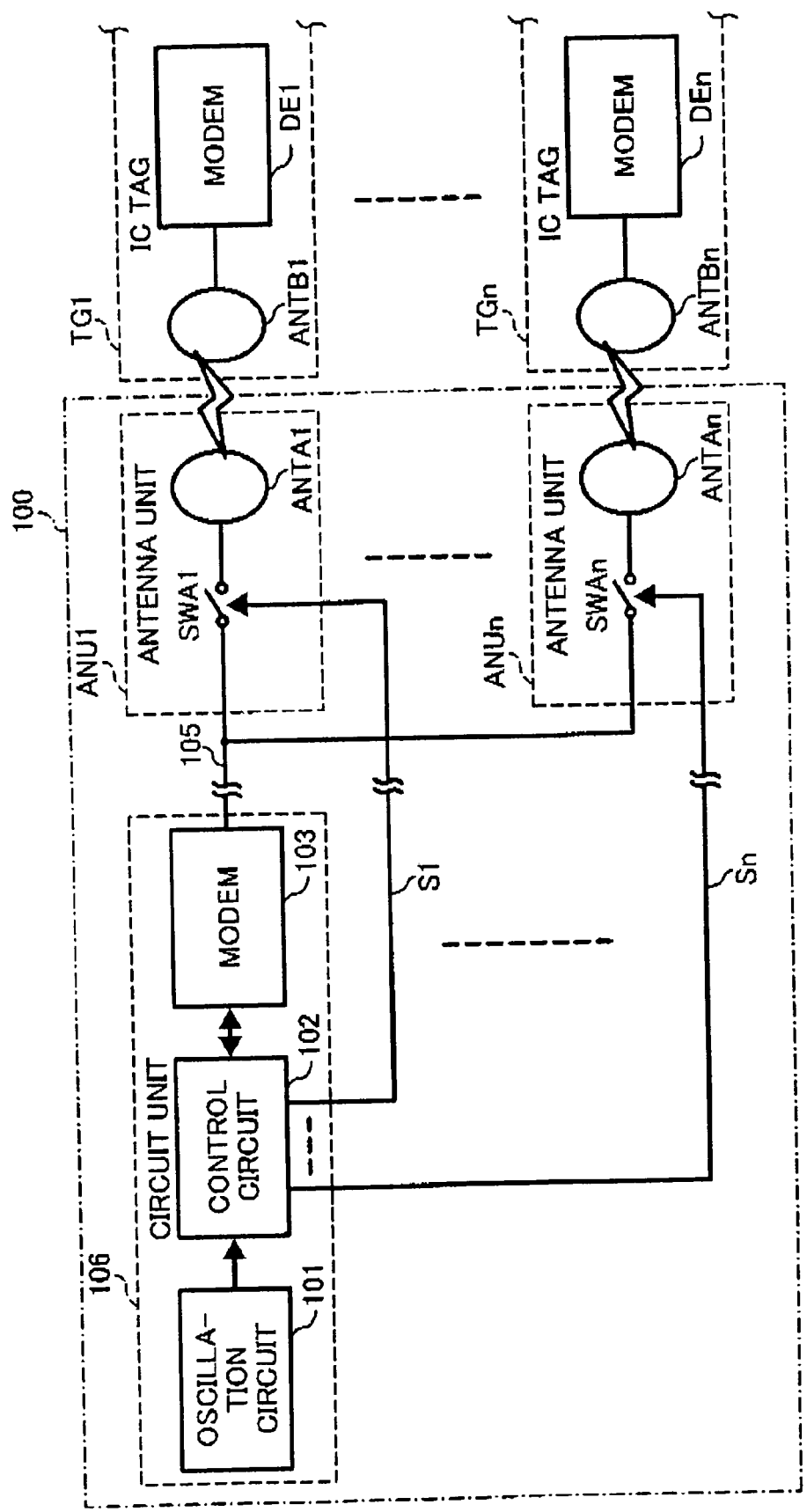
FIG. 1 is a schematic diagram of a background IC tag read-write apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, an IC (integrated circuit) tag read-write apparatus 1 according to an example embodiment is explained.

Figure 2:
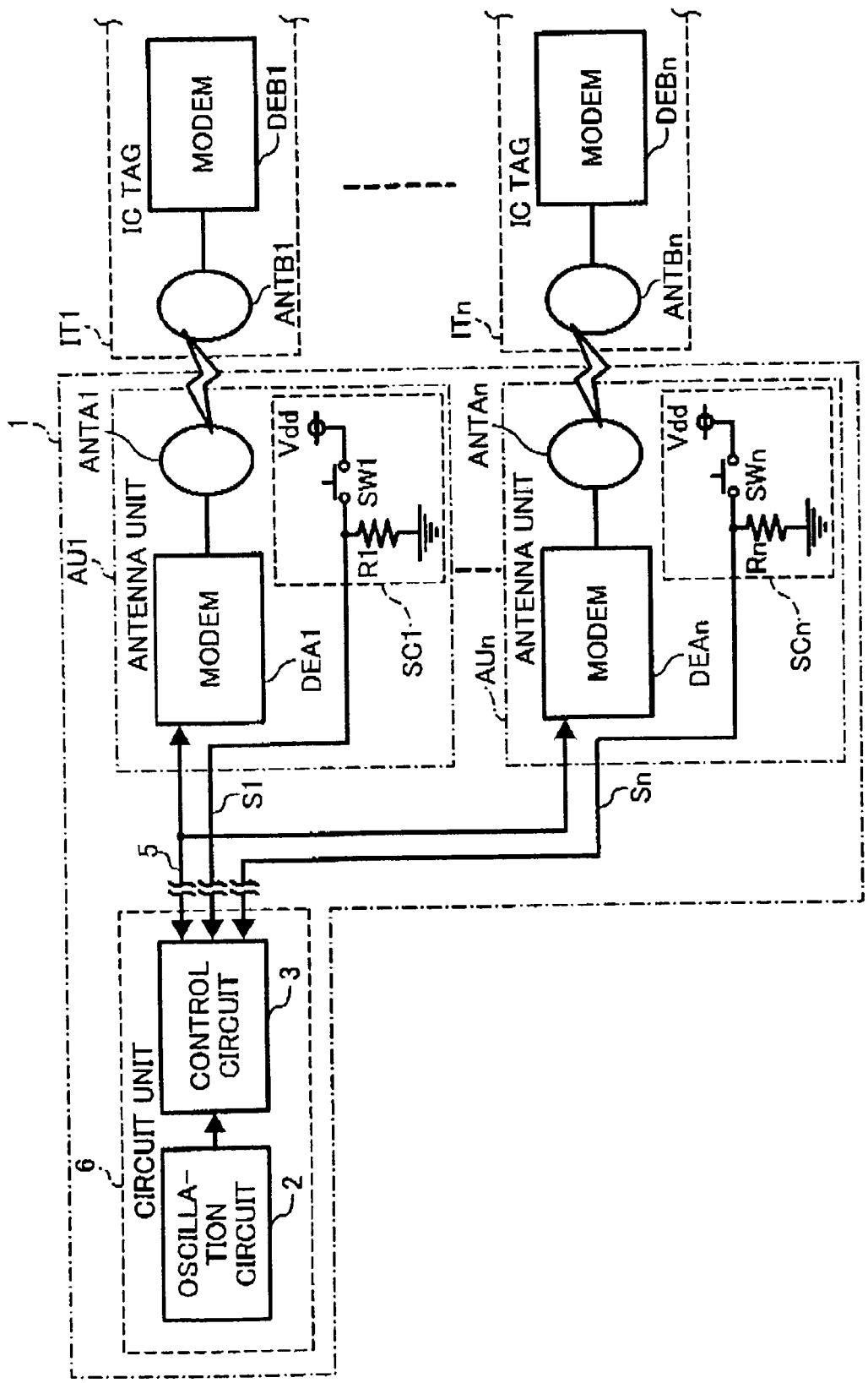
FIG. 2 is a schematic diagram of an IC tag read-write apparatus according to an exemplary embodiment.

As illustrated in FIG. 2, the IC tag read-write apparatus 1 is connected to a plurality of IC (integrated circuit) tags IT1-ITn.

In an alphanumeric expression of elements, such as IT1-ITn, n is an arbitrary integer greater than 1, such as 2, 3, 4, and so on and IT1-ITn means IT1, IT2, IT3, IT4, and IT5 when n is 5. This definition of n is applied to each case when it appears in an alphanumeric expression of elements described below.

The IC tag read-write apparatus 1 includes a circuit unit 6, a plurality of antenna units AU1-AUn, and a transmission link 5, and a plurality of signal lines S1-Sn. The circuit unit 5 includes an oscillation circuit 2 and a control circuit 3 which may be integrated in one chip. The oscillation circuit 2 generates a carrier wave having a predetermined frequency, and the control circuit 3 controls an input and an output of data signals to be superimposed on the carrier wave from the oscillation circuit 2.

The plurality of antenna units AU1-AUn have a structure similar to each other. For example, the antenna unit AU1 includes a modem DEA1, an antenna ANTA1, and a switch circuit SC1, and the antenna unit AUn includes a modem DEAn, an antenna ANTAn, and a switch circuit SCn. Furthermore, the switch circuits SC1-SCn have a structure similar to each other. For example, the switch circuit SC1 includes a resistance R1 and a switch SW1, and the switch circuit SCn includes a resistance Rn and a switch SWn. Each one of the modems DEA1-DEAn may be an integrated circuit chip.

The plurality of IC tags IT1-ITn have a structure similar to each other. For example, the IC tag IT1 includes an antenna ANTB1 and a modem DEB1, and the IC tag ITn includes an antenna ANTBn and a modem DEBn.

Among the plurality of antenna units AU1-AUn, an arbitrary antenna unit AUk includes a modem DEAk, an antennal ANTAk, and a switch circuit SCk, wherein k represents one of 1-n. This definition of k is applied to each case when it appears in an alphanumeric expression of elements described below. The antenna unit AUk communicates with an IC tag ITk via the transmission link 5 and a signal line Sk. The IC tag ITk includes an antenna ANTBk and a modem DEBK and is selected from among the plurality of IC tags IT1-ITn, wherein k represents one of 1-k.

In the circuit unit 6, the oscillation circuit 2 is connected to the control circuit 3, and in the antenna unit AUk, the antenna ANTAk is connected to the modem DEAk. The control circuit 3 and the modem DEAK communicate digitally with each other via the transmission link 5 by using signal lines and/or infrared rays, for example. The oscillation circuit 2 generates the carrier wave to perform radio communication with an IC tag. The carrier wave generally has a frequency of 13.56 MHz. However, depending upon an application, the carrier wave may be of a low frequency such as in the range of from 120 kHz to 500 kHz or a ultra-high frequency such as 900 MHz or 2.45 GHz.

The control circuit 3 controls an input and an output of data to be superimposed on the carrier wave output from the oscillation circuit 2. The modem DEAk uses a specific modulation method to modulate the carrier wave and the data signal received from the control circuit 3 via the transmission link 5 and outputs the modulated signal to the antenna ANTAk. In addition, the modem DEAk uses a specific demodulation method to demodulate signals received from the antennal ANTAK and outputs the demodulated signals to the control circuit 3 via the transmission link 5.

In the switch circuit SCk, a resistance Rk and a switch SWk are connected in series between a source power voltage Vdd and a ground. The switch Swk and the resistance Rk has a connection point which is connected to the control circuit 3 via the signal line Sk. In the plurality of antenna units AU1-AUn, the antenna unit AUk can be set into an unused state when the antenna unit AUk is not needed because the IC tag ITk, which is an IC tag corresponding thereto, is not installed, for example. Having turned the SWk into conduction, the signal circuit SCk sends a high level signal to the control circuit 3 via the signal line Sk. On the other hand, if the antenna unit AUk is needed to be used, the switch SWk is turned off to be brought out of conduction. Thus, the control circuit 3 can recognize the use and disuse of the antenna units. Needless to say, it is possible to preset an alternative configuration so as to turn on the switch SWk to use the antenna unit AUk and to turn off the switch SWk to disuse the antenna unit AUk.

With the above-structure, the IC tag read-write apparatus 1 performs a data writing operation relative to the IC tag ITk, which is an arbitrary IC tag, in a manner as described below. The control circuit 3 synchronizes a signal representing transmission data with the carrier wave. The modem DEAk receives from the control circuit 3 the carrier wave and the transmission data to be superimposed on the carrier wave, and modulates the carrier wave in accordance with the transmission data. Upon the modulation, the modem DEAk transfers the modulated signal to the antenna ANTAk. The antenna ANTAk sends the modulated signal by radio waves. The IC tag ITk receives the radio waves sent from the antenna ANTAk of the IC tag read-write apparatus 1 with the antenna ANTBk and demodulates the received signal with the modem DEAk.

Also, the IC tag read-write apparatus 1 performs a data reading operation relative to the IC tag ITk, in a manner as described below. The IC tag read-write apparatus 1 transmits read command to the IC tag ITk. Upon a reception of read command data sent from the IC tag read-write apparatus 1, the IC tag ITk sends back requested data to the IC tag read-write apparatus 1. More specifically, in the IC tag ITk, the carrier wave is modulated with the modem DEBk in accordance with the contents of the requested data and is transmitted by radio waves via the antenna ANTBk. The IC tag read-write apparatus 1 receives the radio waves with the antenna ANTAK, demodulates the received signal with the modem DEAk, and retrieves the data with the control circuit 3.

The above-described IC tag read-write apparatus 1 is provided with a sufficient flexibility of allocation of the antennas ANTA1-ANTAn by separating the circuit unit 6 from the antenna units AU1-AUn, dividing the antenna units AU1-AUn, and connecting the circuit unit 6 to each of the antenna units AU1-AUn through the transmission link 5. The modem DEAk can be made in a sufficiently small IC chip in comparison with the antenna ANTAk so as to unobtrusively fit on a part of the antenna ANTAk.

In the IC tag read-write apparatus 1, the carrier wave and the superimposed data are demodulated by the modem DEAk and are separated when they are transmitted to the control circuit 3 through the transmission link 5. This allows the transmission link 5 between the control circuit 3 and the modem DEAk to be made longer than a transmission line between the modem DEAk and the antenna ANTAk. Therefore, the IC tag read-write apparatus 1 has a superior flexibility in installation of the control circuit 3 and the antenna units AU1-AUn in a host apparatus. Thus, the host apparatus may not need to be unnecessarily large.

The control circuit 3 initially determines as to whether the communication with the IC tag IT1-ITn is possible by accessing the antenna units AU1-AUn one after another. Accordingly, an access frequency to one antenna unit is decreased with an increase of a number of the antenna units. As a result, the read and write operation by the IC tag read-write apparatus 1 takes long.

To solve this, the switches of the antenna units which are not in use are turned of manually or automatically so that the control unit 3 recognizes those not in use through the initial determination on the communication with the IC tags IT1-ITn. Based on this determination result, the IC tag read-write apparatus 1 skips the accesses to those antennas not in use in order to shorten the time of read and write to the desired IC tag.

For example, in a case a RFID (radio frequency identification) system using the IC tags IT1-ITn and the IC tag read-write apparatus 1 is used for a process control in a factory, it is assumed that a plurality of apparatuses are provided with an antenna unit and a history of which apparatus is used for the process is recorded in respective IC tags. In this case, some of the apparatuses may be unused because they are in repair or maintenance.

Under such a circumstance, the control circuit 3 can determine those antennas in use and those antennas not in use before performing the radio communication with every antenna to avoid an unnecessary radio communication with those antennas not in use.

In general, a communication through lines can be made faster than that through radio waves. Therefore, an attempt of the radio wave communication frequently with those antennas in use is an effective countermeasure against the communication through lines.

The switches SW1-SWn may be turned on and off manually or automatically by using an external control signal. It is also possible as an alternative that a switch for an unused antenna is configured to be turned off and a switch for an in-use antenna is configured to be turned on.

Figure 3:
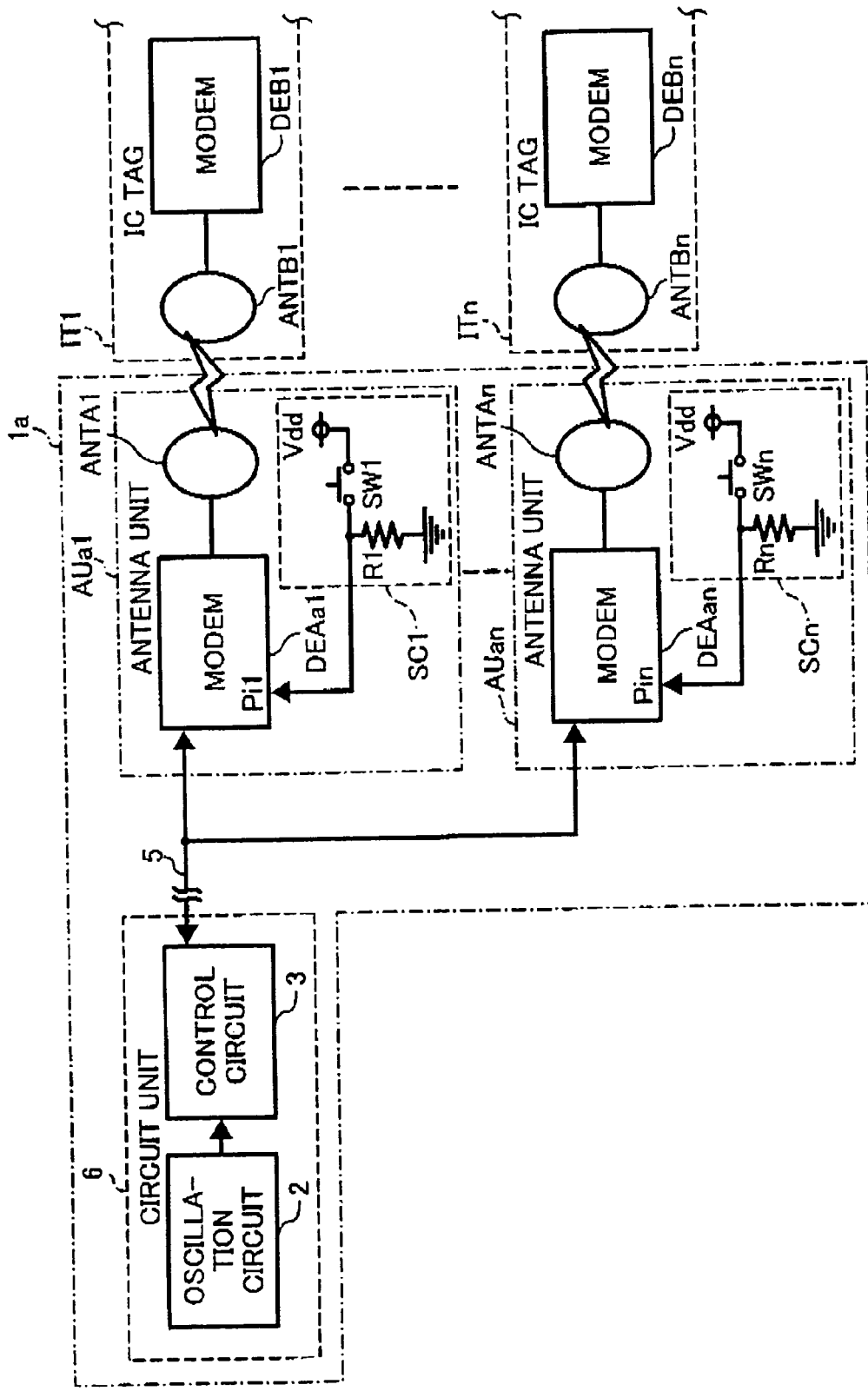
FIGS. 3-7 are schematic diagrams of IC tag read-write apparatuses according to other embodiments.

Referring to FIG. 3, an IC tag read-write apparatus 1a according to another exemplary embodiment is explained. The IC tag read-write apparatus 1a of FIG. 3 is similar to the IC tag read-write apparatus 1 of FIG. 2, except for a circuit handling the signal lines for representing on and off states of the switches SW1-SWn. That is, since the IC tag read-write apparatus 1 of FIG. 2 uses the signal lines S1-Sn to connect the control circuit 3 to the distant antenna units AU1-AUn, the cost of the signal lines increase with an increase of distance between the control unit 3 and the antenna units AU1-AUn. To eliminate this cost increase, as illustrated in FIG. 3, the IC tag read-write apparatus 1a has a structure in which the signal lines connecting the control circuit 3 to the distant antenna units AU1-Aun are removed and instead binary-level signals output from the switch circuits SW1-SWn are input to the modems DEAa1-DEAan.

As illustrated in FIG. 3, the IC tag read-write apparatus 1a is provided with a plurality of antenna units AUa1-AUan, and the control circuit 3 and the plurality of antenna units AUa1-AUan are connected through the transmission link 5. The plurality of antenna units AUa1-AUan include a plurality of modems DEAa1-DEAan each of which has an input port. That is, the medem DEAa1 has an input port Pi1, and the modem DEAan has an input port Pin, for example. The binary-level signals output from the switch circuits SC1-SCn are input to the input ports Pi1-Pin of the plurality of modems DEAa1-DEAan. For example, the binary-level signal output from the switch circuit SC1 is input to the input port Pi1 of the modem DEAa1, and the binary-level signal output from the switch circuit SCn is input to the input port Pin of the modem DEAan.

The plurality of modems DEAa1-DEAan transfer the received binary-level signals to the control circuit 3 via the transmission link 5. Thus, the control circuit 3 can recognize the use and disuse of the antenna units.

With the above-described structure, the IC tag read-write apparatus 1a can perform the data writing and reading operations in manners similar to the IC tag read-write apparatus 1 with an advantageous effect of suppressing an increase of the wiring cost in a case the antenna units AUa1-AUan are disposed at locations distant from the control circuit 3.

Figure 4:
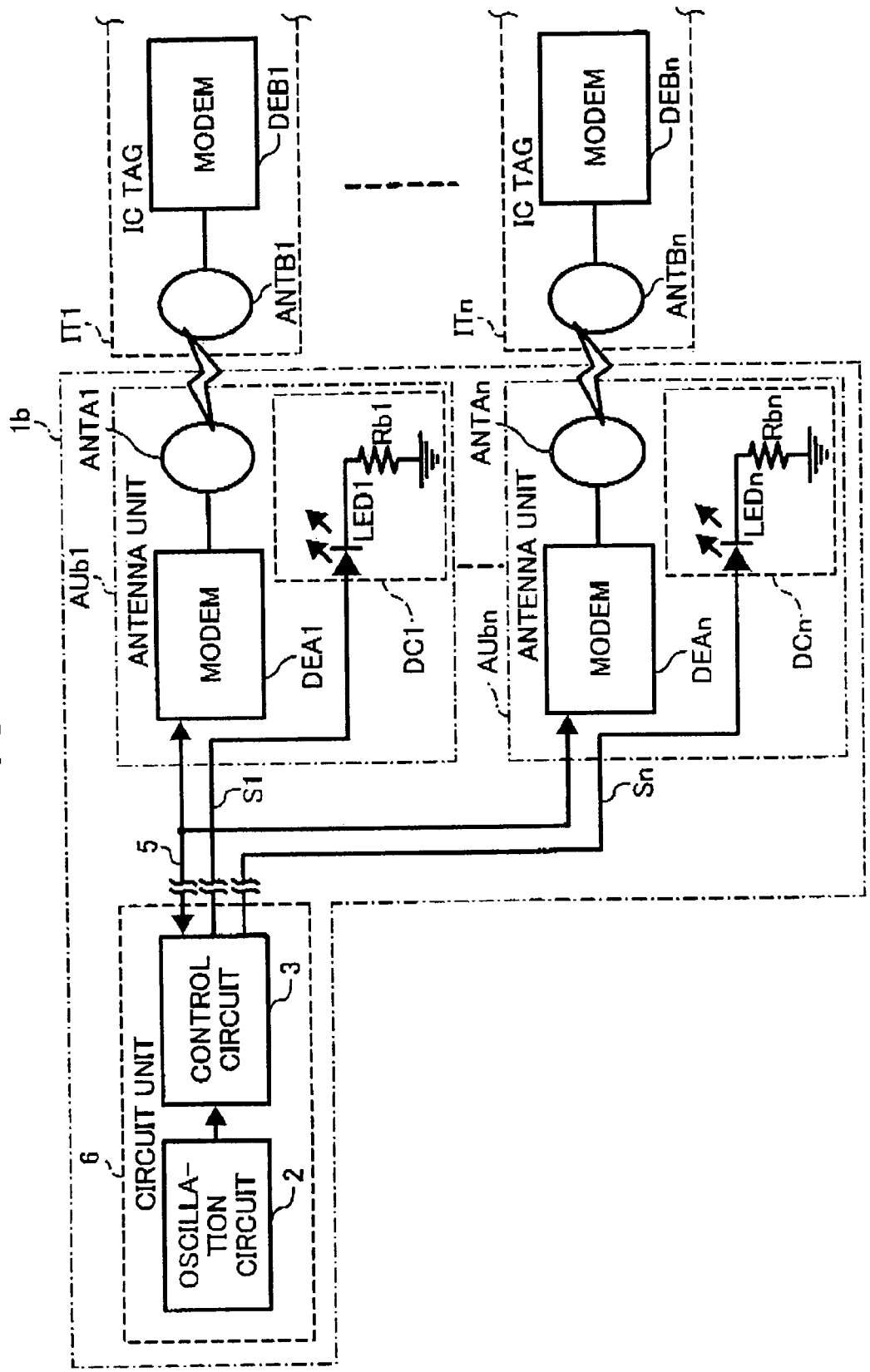

Referring to FIG. 4, an IC tag read-write apparatus 1b according to another exemplary embodiment is explained. At a factory like environment, a plurality of fabricating apparatuses may be distantly located from each other and each of them may be provided with an antenna unit for a remote communication with a central control unit. In such a circumstance, the central control unit performs communication with the plurality of fabricating apparatuses via the antenna one after another. If some of the fabricating apparatuses are not in use, it is preferable to skip the communication with these apparatuses by tentatively disabling corresponding antenna units so that the central control unit can perform the communication with the fabricating apparatuses in operation at a high frequency. In this case, visual indication to indicate an on and off status of a fabricating apparatus to an operator who is present near the fabricating apparatus. Without such an indicator, the operator cannot recognize a status whether the central control unit is communicating with this specific fabricating apparatus or not.

As illustrated in FIG. 4, the IC tag read-write apparatus 1b is similar to the IC tag read-write apparatus 1 of FIG. 2, except for a plurality of display circuits DC1-DCn which replace the plurality of switch circuits SC1-SCn of FIG. 2. According to this physical changer the plurality of antenna units AU1-AUn are relabeled as a plurality of antenna units AUb1-AUbn.

As illustrated in FIG. 4, the display circuits DC1-DCn have a structure similar to each other. For example, the display circuit DC1 includes a light-emitting diode LED1 and a resistance Rb1, and the display circuit DCn includes a light-emitting diode LEDn and a resistance Rbn.

An arbitrary display circuit DCk includes a light-emitting diode LEDk and a resistance Fbk. The light-emitting diode LEDk has an anode connected to the control circuit 3 via a signal line Sk and a cathode connected to a ground via the resistance Rbk.

When an IC tag is not installed in a target apparatus to be checked, a corresponding antenna unit AUbk, for example, may not used in order to increase a frequency rate of the communication between the control circuit 3 and each of the target apparatuses via those antennas set in operation. In such a case, the control circuit 3 sends a low signal through the signal line Sk to a corresponding light-emitting diode LEDK to turn off while maintaining a high signal to the remaining light-emitting diodes to keep them lit on.

The relationship between an antenna usage and a diode lighting may be modified as an alternative such that a diode is turned off when a corresponding antenna is in operation and a diode is turned on when a corresponding antenna is not in operation.

With the above-described structure, the IC tag read-write apparatus 1b can perform the data writing and reading operations in manners similar to the IC tag read-write apparatus 1 with an advantageous function to display which antennas are in operation and which antennas are not in use.

Figure 5:
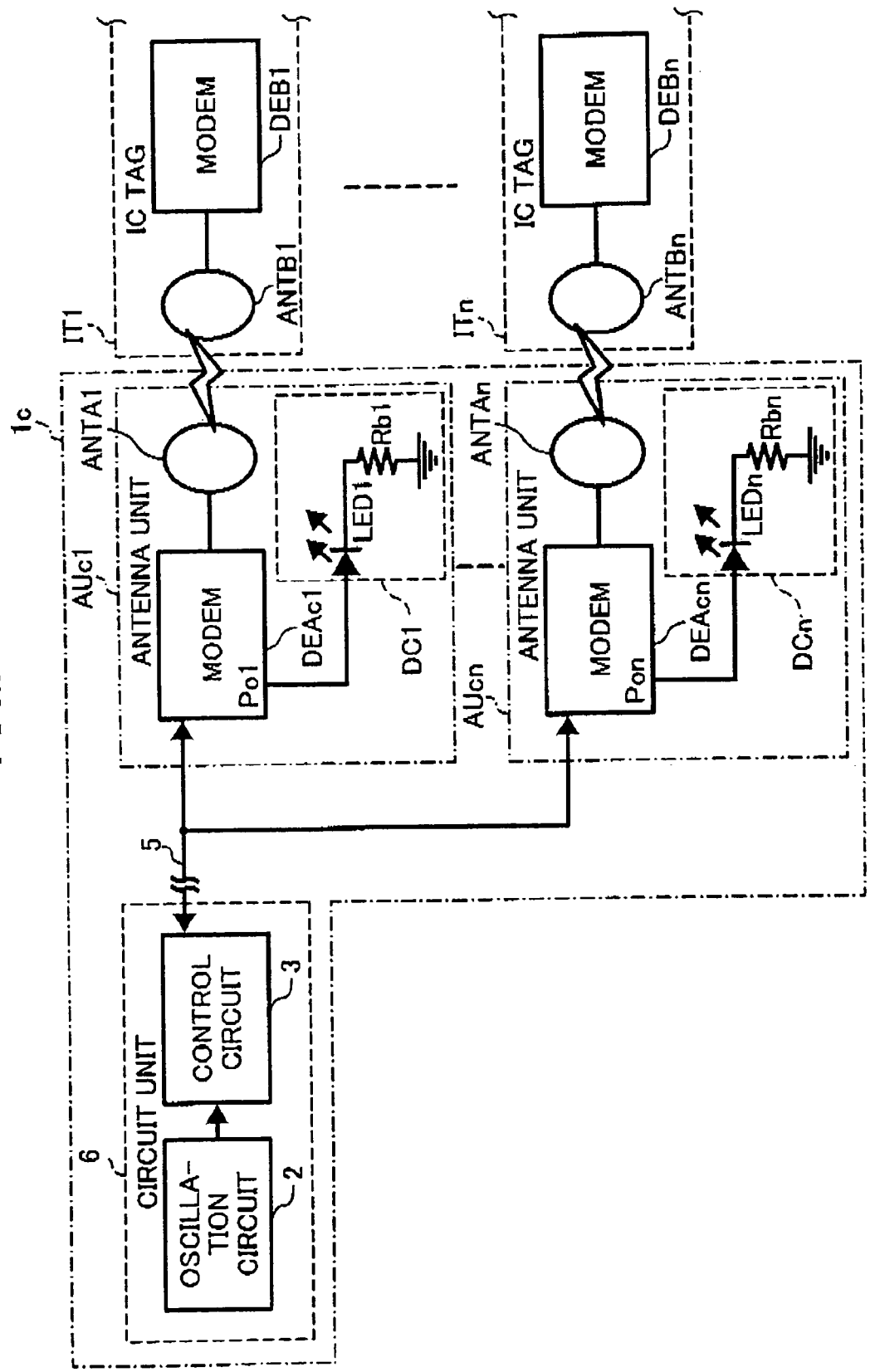

Referring to FIG. 5, an IC tag read-write apparatus 1c according to another exemplary embodiment is explained. As illustrated in FIG. 5, the IC tag read-write apparatus 1c is made based on the IC tag read-write apparatuses 1a of FIG. 3 and 1b of FIG. 4, and is similar to the IC tag read-write apparatus 1b of FIG. 4, except for a circuit handling the signal lines for representing on and off states of the display circuits DC1-DCn. That is, since the IC tag read-write apparatus 1b of FIG. 4 uses the signal lines S1-Sn to connect the control circuit 3 to the distant antenna units AUb1-AUbnr the cost of the signal lines increase with an increase of distance between the control unit 3 and the antenna units AUb1-AUbn. To eliminate this cost increase, as illustrated in FIG. 5, the IC tag read-write apparatus 1c has a structure in which the signal lines connecting the control circuit 3 to the distant antenna units AUb1-AUbn are removed and instead binary-level signals output from the modems DEAc1-DEAcn are input to the display circuits DC1-DCn, respectively.

As illustrated in FIG. 5, the IC tag read-write apparatus 1c is provided with a plurality of antenna units AUc1-AUcn, and the control circuit 3 and the plurality of antenna units AUc1-AUcn are connected through the transmission link 5. The plurality of antenna units AUc1-AUcn include a plurality of modems DEAc1-DEAcn each of which has an output port. That is, the medem DEAc1 has an output port Po1, and the modem DEAcn has an output port Pon, for example. The binary-level signals output from the output ports Po1-Pon of the respective modems DEAc1-DEAcn are input to the display circuits DC1-DCn. For example, the binary-level signal output from the output port Po1 of the modem DEAc1 is input to the display circuit DC1, and the binary-level signal output from the output port Pon of the modem DEAcn is input to the display circuit DCn.

The above-mentioned binary-level signals are transferred from the control circuit 3 to the plurality of modems DEAc1-DEAcn via the transmission link 5.

With the above-described structure, the IC tag read-write apparatus 1c can perform the data writing and reading operations in manners similar to the IC tag read-write apparatus 1 with an advantageous function to display which antennas are in operation and which antennas are not in use and an advantageous effect of suppressing an increase of the wiring cost in a case the antenna units AUc1-AUcn are disposed at locations distant from the control circuit 3.

Figure 6:
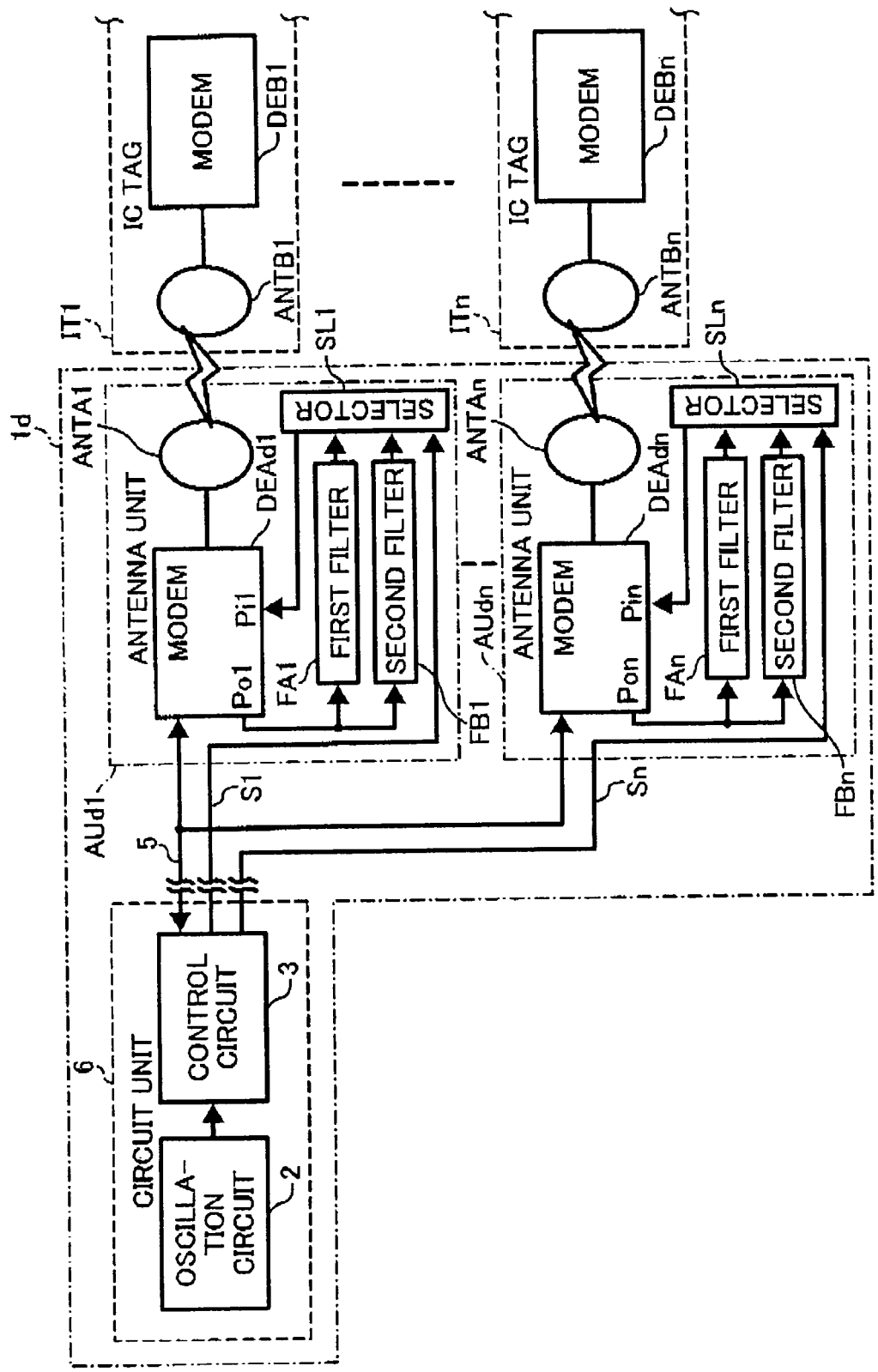

Referring to FIG. 6, an IC tag read-write apparatus 1d according to another exemplary embodiment is explained. In an IC tag read-write apparatus, a modem may be configured in a semiconductor integrated circuit. However, a set of analog filters generally included in a modem for modulation and demodulation of data may preferably be configured outside the semiconductor integrated circuit with discrete components such as capacitors and resistances for a cost reason. In addition, an IC tag read-write apparatus compatible to a plurality of communication standards may need to selectively use an analog filter having a suitable communication property in accordance with a communication standard in use. Under such a circumstance, an IC tag read-write apparatus may preferably be provided with a plurality of filters and is configured to cause the circuit unit 6 to select a signal level of an output signal from each of the plurality of modems through a serial digital communication.

As illustrated in FIG. 6, the IC tag read-write apparatus 1d is similar to the IC tag read-write apparatus 1 of FIG. 2, except for a plurality of antenna units AUd1-AUdn which replace the plurality of antenna units AU1-AUn of FIG. 2. The plurality of antenna units AUd1-AUdn of FIG. 6 are similar to the plurality of antenna units AU1-AUn, except for a modem, two filters, and a selector. More specifically, for example, the antenna unit AUd1 includes a modem DEAd1, a first filter FA1, a second filter FB1, and a selector SL1. The modem DEAd1 replaces the modem DEA1 of FIG. 2. The first and second filters FA1 and FB1 and the selector SL1 together replace the switch circuit SW1 of FIG. 2. For another example, the antenna unit AUdn includes a modem DEAdn, a first filter FAn, a second filter FBn, and a selector SLn. The modem DEAdn replaces the modem DEAn of FIG. 2. The first and second filters FAn and FBn and the selector SLn- together replace the switch circuit SWn of FIG. 2.

In this configuration, when k is defied as an arbitrary positive integer varying from 1 to n, it can be expressed such that an arbitrary antenna unit AUdk includes a modem DEAdk, an antenna ANTAk, a first filter FAk, a second filter FBk, and a selector SLk. Also, it can be expressed such that the antenna unit AUdk corresponds to the antenna unit ANTBk which is installed in an apparatus to be checked.

In the antenna unit AUdk, the first and second filters FAk and FBk are connected to an output port Pok of the modem DEAdk. Also, the selector SLk is connected to the control circuit 3 through the signal line Sk, the first and second filters FAk and FBk, and an input port Pik of the modem DEAdk, In this configuration, the selector SLk receives a control signal from the control circuit 3 through the signal line Sk and exclusively selects one of the first and second filters FAk and FBk in accordance with the control signal so that a suitable filter, i.e., one of the first and second filters FAk and FBk, is connected to the input port Pik of the modem DEAdk.

With the above-described structure, the IC tag read-write apparatus 1d can perform the data writing and reading operations in manners similar to the IC tag read-write apparatus 1 with an advantageous function to suitably change an analog filter to the one having a suitable communication property in accordance with a communication standard in use.

It should be noted that each of the plurality of modems DEAdl-OEAdn may be fabricated in one IC chip in the IC tag read-write apparatus 1*d* so as to contribute to a downsizing and a cost reduction of the apparatus.

Figure 7:
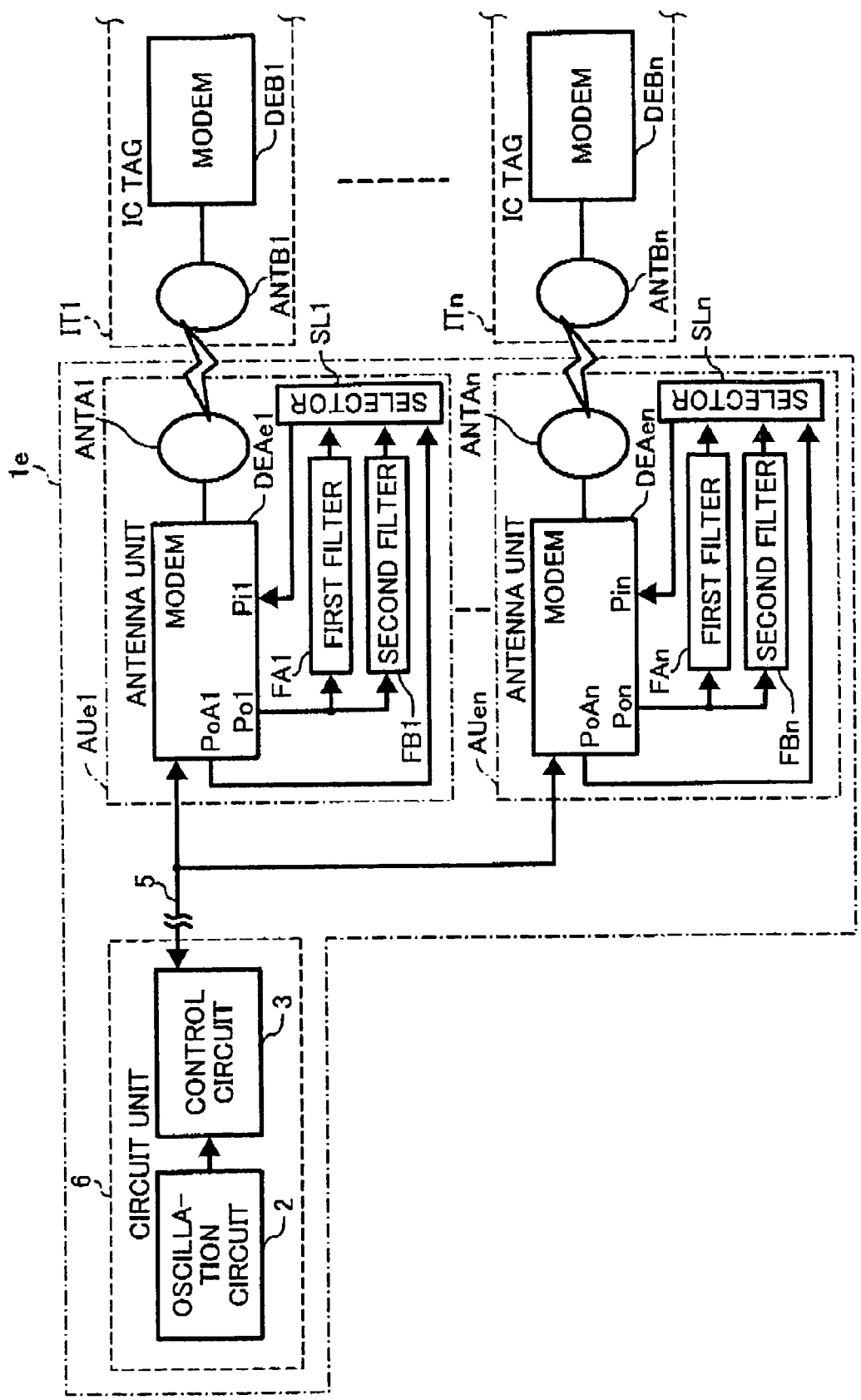

Referring to FIG. 5, an IC tag read-write apparatus 1*e* according to another exemplary embodiment is explained. As illustrated in FIG. 7, the IC tag read-write apparatus 1*e* is made based on the IC tag read-write apparatuses 1*c* of FIG. 5 and 1*d* of FIG. 6, and is similar to the IC tag read-write apparatus 1*d* of FIG. 6, except for a circuit handling the signal lines for instructing the selector. That is, since the IC tag read-write apparatus 1*d* of FIG. 6 uses the signal lines S1-Sn to connect the control circuit 3 to the distant antenna units AUd1-AUdn, the cost of the signal lines increase with an increase of distance between the control unit 3 and the antenna units AUd1-AUdn. To eliminate this cost increase, as illustrated in FIG. 7, the IC tag read-write apparatus 1*e* has a structure in which the signal lines connecting the control circuit 3 to the distant antenna units AUd1-Audn are removed and instead binary-level signals output from the modems DEAe1-DEAen are input to the first filters FA1-Fan and the second filters FB1-FBn, respectively.

As illustrated in FIG. 7, the IC tag read-write apparatus 1*e* is provided with a plurality of antenna units AUe1-AUen, and the control circuit 3 and the plurality of antenna units AUe1-AUen are connected through the transmission link 5. The plurality of antenna units AUe1-AUen include a plurality of modems DEAe1-DEAen each of which has an auxiliary output port. That is, the medem DEAe1 has an output port PoA1, and the modem DEAen has an output port PoAn, for example. Select ignals output from the output ports PoA1-PoAn of the respective modems DEAe1-DEAen are input to the selectors SL1-SLn. For example, the select signal output from the output port PoA1 of the modem DEAe1 is input to the selector SL1, and the select signal output from the output port PoAn of the modem DEAen is input to the selector SLn.

The above-mentioned select signals are transferred from the control circuit 3 to the plurality of modems DEAe1-DEAen via the transmission link 5.

Thus, the antenna unit (i.e., one of the plurality of antenna units AUe1-AUen) can select an analog filter having a suitable communication property in accordance with a communication standard in use.

With the above-described structure, the IC tag read-write apparatus 1*e* can perform the data writing and reading operations in manners similar to the IC tag read-write apparatus 1*d* with an advantageous function to suitably select an analog filter having a suitable communication property in accordance with a communication standard in use and an advantageous effect of suppressing an increase of the wiring cost in a case the antenna units AUe1-AUen are disposed at locations distant from the control circuit 3.

As an alternative, it may be possible to combine the structure of one of the IC tag read-write apparatuses 1 and 1*a* with the structure of one of the IC tag read-write apparatuses 1*b* and 1*c*. That is, an IC tag read-write apparatus may have the switch circuit (e.g., SC1) and the display circuit (e.g., the display circuit DC1).

As a further alternative, it may be possible to enhance the structure of the IC tag read-write apparatuses 1*d* and 1*e* by increasing a number of selectable filters.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2005-371729 filed on Dec. 26, 2006 in the Japan Patent Office, the entire contents of which are incorporated by reference herein.

What is claimed is:

1. An IC tag read-write apparatus, comprising:
a control circuit configured to control data relative to an outgoing carrier wave and an incoming carrier wave;
a transmission link; and
a plurality of antenna units corresponding to a plurality of IC tags, each one of the plurality of antenna units including:
a modem connected to the control circuit through the transmission link and configured to modulate the carrier wave based on the data in a data writing operation and to demodulate the incoming carrier wave in a data reading operation;
a first antenna configured to send the modulated carrier wave by air to a second antenna of a corresponding one of the plurality of IC tags; and
an indication circuit configured to generate property information with respect to the antenna unit,
wherein the control circuit is configured to communicate with the plurality of IC tags via the corresponding plurality of antenna units and wherein the control circuit is configured to control the plurality of antenna units.

2. The IC tag read-write apparatus of claim 1, wherein the property information includes a status of usage of the antenna unit, and the indication circuit sends an indication signal representing the status of usage of the antenna unit to the control circuit.

3. The IC tag read-write apparatus of claim 2, wherein the indication circuit includes a switch, and sends the indication signal representing the status of usage of the antenna unit to the control circuit by manually turning on the switch.

4. The IC tag read-write apparatus of claim 2, wherein the indication circuit sends the indication signal representing the status of usage of the antenna unit to the control circuit by performing a switching in response to an external input signal.

5. The IC tag read-write apparatus of claim 2, further comprising:
a plurality of signal lines independently connecting the plurality of antenna units to the control unit, wherein the indication circuit sends the indication signal representing the status of usage of the antenna unit to the control circuit through a corresponding one of the plurality of signal lines.

6. The IC tag read-write apparatus of claim 2, wherein the indication circuit sends the indication signal representing the status of usage of the antenna unit to the control circuit via the modem and the transmission link.

7. The IC tag read-write apparatus of claim 6, wherein the modem includes an input port for receiving the indication signal sent from the indication circuit.

8. The IC tag read-write apparatus of claim 1, wherein the property information includes a status of the antenna unit, and the indication circuit generates and displays the property information in response to an input control signal.

9. The IC tag read-write apparatus of claim 8, wherein the indication circuit receives the input control signal from the control circuit.

10. The IC tag read-write apparatus of claim 9, wherein the indication circuit further includes a light-emitting element configured to light on in response to the input control signal sent from the control circuit via the corresponding one of the plurality of signal lines.

11. The IC tag read-write apparatus of claim 10, further comprising: a plurality of signal lines independently connecting the plurality of antenna units to the control unit, wherein the indication circuit receives the input control signal from the control unit via a corresponding one of the plurality of signal lines.

12. The IC tag read-write apparatus of claim 10, wherein the indication circuit receives the input control signal from the control unit via the transmission link and the modem.

13. The IC tag read-write apparatus of claim 12, wherein the modem is integrated in one chip having an output port.

14. An IC tag read-write apparatus, comprising:
a control circuit configured to control data relative to an outgoing carrier wave and an incoming carrier wave;
a transmission link; and
a plurality of antenna units corresponding to a plurality of IC tags, each one of the plurality of antenna units including:
a modem connected to the control circuit through the transmission link and configured to modulate the carrier wave based on the data in a data writing operation and to demodulate the incoming carrier wave in a data reading operation;
a first antenna configured to send the modulated carrier wave by air to a second antenna of a corresponding one of the plurality of IC tags; and
a filter circuit including a plurality of analog filters having properties different from each other and configured to selectively connect one of the plurality of analog filters to the modem on an exclusive basis in response to an input control signal,
wherein the control circuit is configured to communicate with the plurality of IC tags via the corresponding plurality of antenna units and wherein the control circuit is configured to control the plurality of antenna units.

15. The IC tag read-write apparatus of claim 14, wherein the input control signal is sent from the control circuit.

16. The IC tag read-write apparatus of claim 15, further comprising: a plurality of signal lines independently connecting the plurality of antenna units to the control unit, wherein the filter circuit receives the input control signal from the control unit via a corresponding one of the plurality of signal lines.

17. The IC tag read-write apparatus of claim 15, wherein the filter circuit receives the input control signal from the control unit via the transmission link and the modem.

18. The IC tag read-write apparatus of claim 15, wherein the modem is integrated in one chip having a first port for connecting the first antenna, a second port for connecting the transmission link, and a third port for connecting the filter circuit.

19. An antenna apparatus for use in an IC tag read-write apparatus having a control circuit and a transmission link, the antenna apparatus comprising:
a plurality of antenna units corresponding to a plurality of IC tags, each one of the plurality of antenna units including:
a modem connected to the control circuit through the transmission link and configured to modulate the carrier wave based on the data in a data writing operation and to demodulate the incoming carrier wave in a data reading operation;
a first antenna configured to send the modulated carrier wave by air to a second antenna of a corresponding one of the plurality of IC tags; and
a filter circuit including a plurality of analog filters having properties different from each other and configured to selectively connect one of the plurality of analog filters to the modem on an exclusive basis in response to an input control signal,
wherein the plurality of antenna units are configured to allow the control circuit to communicate with the plurality of IC tags via the plurality of antenna units and wherein the plurality of antenna units are configured to be controlled by the control circuit.

20. The antenna apparatus of claim 19, wherein the modem is integrated in one chip having a first port for connecting the first antenna, a second port for connecting the transmission link, and a third port for connecting the filter circuit.

* * * * *